US011773543B2

(12) United States Patent
Fisher et al.

(10) Patent No.: US 11,773,543 B2
(45) Date of Patent: Oct. 3, 2023

(54) PROTECTIVE SURFACE AND CUSHION LAYER USED IN SUCH A SURFACE

(71) Applicant: PlayCore Wisconsin, Inc., Chattanooga, TN (US)

(72) Inventors: Larry L. Fisher, St. Charles, MI (US); Alexander J. Dawe, Perry, MI (US)

(73) Assignee: PLAYCORE WISCONSIN, INC., Chattanooga, TN (US)

( * ) Notice: Subject to any disclaimer, the term of this patent is extended or adjusted under 35 U.S.C. 154(b) by 668 days.

(21) Appl. No.: 16/815,732

(22) Filed: Mar. 11, 2020

(65) Prior Publication Data

US 2021/0285165 A1    Sep. 16, 2021

(51) Int. Cl.
*E01C 13/06* (2006.01)
*C08L 17/00* (2006.01)
*E01C 13/00* (2006.01)

(52) U.S. Cl.
CPC ............ *E01C 13/065* (2013.01); *C08L 17/00* (2013.01); *E01C 13/00* (2013.01)

(58) Field of Classification Search
CPC ......... E01C 13/00; E01C 13/065; C08L 17/00
See application file for complete search history.

(56) References Cited

U.S. PATENT DOCUMENTS

| | | | | |
|---|---|---|---|---|
| 4,457,120 A * | 7/1984 | Takata | ................. | E01C 13/065 52/309.4 |
| 4,897,302 A * | 1/1990 | Bull | ..................... | E01C 13/065 427/407.1 |
| 6,090,438 A * | 7/2000 | Dixon | .................. | E01C 13/065 427/407.1 |
| 6,200,638 B1 * | 3/2001 | Ordway | ................. | E04F 15/12 427/407.1 |
| 2004/0198508 A1 * | 10/2004 | Bennett | ................ | E01C 13/065 472/92 |
| 2010/0124633 A1 * | 5/2010 | Sacks | .................... | E01C 13/065 427/136 |
| 2014/0287844 A1 * | 9/2014 | Schneider | ............ | E01C 13/065 472/92 |
| 2017/0081807 A1 * | 3/2017 | Tetrault | .................. | B32B 25/00 |
| 2017/0226707 A1 * | 8/2017 | Hassan | .................. | E01C 19/52 |

* cited by examiner

*Primary Examiner* — Abigail A Risic
(74) *Attorney, Agent, or Firm* — McAndrews, Held & Malloy, Ltd.

(57) ABSTRACT

A poured-in-place protective surface, such as can be installed at a playground, includes an impact-attenuation or cushion layer, which comprises a blend of (a) a rubber chunk component made up of granules of reclaimed rubber, the reclaimed rubber being from non-tire sources; (b) a tire buffings component; and (c) a binder. The ratio of rubber chunk component to tire buffings component is selected to be between 1.25:1 and 10:1, and more particularly between 1.25:1 and 5:1.

20 Claims, 2 Drawing Sheets

PROTECTIVE SURFACE AND CUSHION LAYER USED IN SUCH A SURFACE

BACKGROUND

Playgrounds typically include a protective play surface that is designed to reduce the risk of injury from falls. That protective play surface is often a poured-in-place surface comprising at least two distinct layers: a cushion layer and a cap layer. To install the protective surface, the cushion layer is generally prepared on-site by blending one or more shredded rubber, e.g. tire, materials consisting predominantly or essentially of styrene butadiene rubber with a binder. The cushion layer may then be poured into an excavated area to a predetermined depth/thickness. Similarly, the cap layer is generally prepared on-site and poured over the top of the installed cushion layer.

Embodiments of the present invention are directed to a new cushion layer that can be used to prepare such a protective surface. In particular, the cushion layer of the present invention includes a mixture of rubber materials reclaimed from non-tire sources in place of the shredded tire material that is used conventionally. This provides the cushion layer, and indeed the entire protective surface, with a number of benefits over conventional cushion layers and protective surfaces.

SUMMARY OF THE INVENTION

The present invention relates to a new protective surface, such as may be installed as a play surface in a playground, and in particular to a new and improved cushion layer for use in that protective surface.

Embodiments of the present invention are directed to a cushion layer for a protective surface, such as that which may be used to create a play surface at a playground. The cushion layer may be made up of a blend of (a) a rubber chunk component, (b) a tire buffings component, and (c) a binder. The rubber chunk component may be granules of rubber scrap that is reclaimed from pre-consumer, post-industrial waste. The rubber chunk component may comprise a mixture of different rubber materials. Notably, however, the rubber scrap is not from tires. Accordingly, in contrast to shredded tire materials, the rubber scrap is not predominantly styrene/butadiene rubber (SBR). Rather, the rubber chunk component may contain relatively little or no styrene butadiene rubber, e.g. less than 25% SBR. The tire buffings are elongated, i.e. fiber-like, strands consisting predominantly or essentially of styrene/butadiene rubber (SBR), which are typically obtained from the re-capping of commercial trucking tires. The binder may be any suitable binder material, including for example polyurethane.

The ratio of the rubber chunk component and the tire buffings component may be selected to provide the cushion layer with desirable properties. In some embodiments, for example, the chunk component and the tire buffings component may be present in a ratio between 1.25:1 and 5:1 (chunk:buffings), alternatively the chunk component and the tire buffings component may be present in a ratio between 1.5:1 and 3:1 (chunk:buffings). Notably, as a higher proportion of the chunk component is used, the amount of binder needed to produce the cushion layer is reduced. For instance, by utilizing a ratio of chunk to buffings within the disclosed ranges, the binder may make up less than 10% by weight of the blend, alternatively less than 8% by weight of the blend, alternatively less than 7% by weight of the blend. Because the binder is typically relatively expensive, this material utilization reduces the overall cost of the cushion layer, and thus of the protective surface.

Further, the chunk component is typically softer than the styrene butadiene rubber (SBR) of tires. For instance, while the predominantly styrene butadiene rubber of tire shreddings has a mean Shore A durometer of about 75, the chunk component disclosed herein may have a mean Shore A durometer of less than 75, alternatively less than 70, alternatively less than 65, alternatively less than 60 (as determined via conventional testing methods). Relatedly, whereas the tire shreddings may have Shore A durometers ranging between 60 and 80, the chunk component disclosed herein may have Shore A durometers extending well below that range. In some embodiments, for instance, the rubber granules that make up the chunk component may have Shore A durometers ranging between about 45 and about 80. Thus, a higher proportion of the chunk component may also lead to an increase the softness of the cushion layer, such that the thickness of the cushion layer—and hence the overall amount of material needed to prepare the protective surface—may be reduced, bringing about further cost reductions as well as further material utilization savings.

Embodiments of the present invention are also directed to a protective surface comprising a cushion layer described herein. In some embodiments, for instance, the protective surface may comprise a cushion layer and an overlying cap layer. The cap layer may comprise EPDM, TPV (thermoplastic vulcanizates), or a treated rubber/polyurethane blend. The cap layer may be prepared in any number of desirable colors. In some embodiments, the cap layer may comprise a synthetic grass or turf component. The thickness of the cushion layer may be selected depending on the degree of protection required, which for a playground may be related to the critical fall height from which a child may experience a fall. The cushion layer may generally be between about one inch and about ten inches thick, alternatively between about one inch and about eight inches thick, alternatively between about one inch and about five inches thick. The cap layer may generally be less than one inch thick.

Embodiments of the present invention are also directed to methods of making the cushion layers described herein and methods of making protective surfaces containing the cushion layers described herein. For instance, embodiments of the present invention are directed to a method of making a cushion layer for a protective surface that includes providing a rubber chunk component such as those disclosed herein, providing a tire buffings component, providing a binder, and blending the rubber chunk component, the tire buffings component, and the binder in any of the ratios disclosed herein to produce a pourable cushion layer. The method may further include installing the cushion layer, such as by pouring the cushion layer into an excavated cavity and spreading the cushion layer to a substantially even thickness within that cavity. The method may also include installing a cap layer over the top of the cushion layer.

In another aspect of the present invention, it has also been recognized that the protective surfaces disclosed herein can be used to reduce the risk of injury at playgrounds. For example, embodiments of the present invention are directed to a protective surface having a desirable combination of thickness (which is directly related to material usage, and thus cost) and Head Injury Criterion (HIC) properties, as tested by the IPEMA (International Play Equipment Manufacturers Association) Impact Attenuation Test ASTM F1292-18 (Rev. 6, Effective Date 2018-1-25). The Head Injury Criterion or HIC score is an empirical measure of impact severity based on published research describing the relationship between the magnitude and duration of impact accelerations and the risk of head trauma. The HIC score of a surface is measured in accordance with the standards set out in ASTM F1291-18, which provides a means of determining impact attenuation performance using a test method that simulates the impact of a person's head with the surface.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

The present disclosure is directed to a cushion layer 10 for a protective surface and a protective surface 100 comprising that cushion layer. The protective surface 100 may be installed to form a ground surface of an outdoor recreational area, such as a playground.

Figure 1:
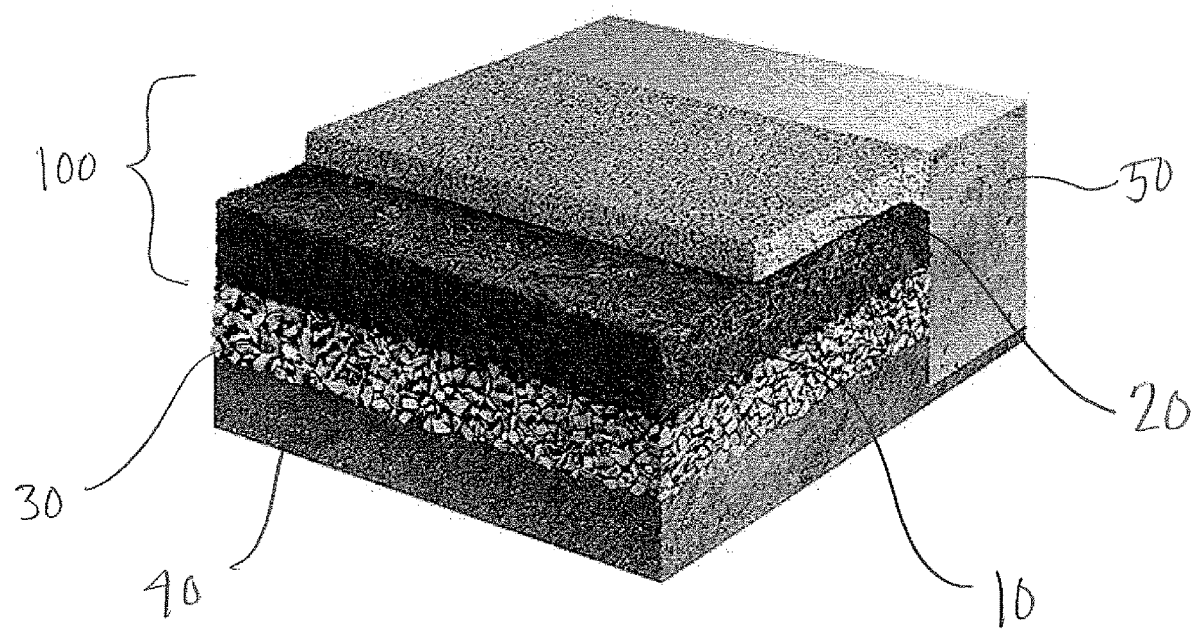
FIG. 1 is a perspective view showing the various layers of a protective surface according to an embodiment of the present disclosure.

An embodiment of a protective surface 100 is shown in FIG. 1. As shown in FIG. 1, the protective surface 100 may comprise a cushion layer 10 and a cap layer 20. Prior to laying down the cushion layer 10, an excavated cavity may be filled with a sub-base 30 in order to provide a firm, non-eroding base for the protective surface 100. As illustrated, the sub-base 30 may comprise an aggregate material such as compacted stone 30 or the like. In other embodiments, the sub-base may be a solid asphalt or concrete layer. Also shown in FIG. 1 are the uppermost layer of earth 40 that forms the surface of the excavated cavity and an optional border 50, such as may be installed around one or more edges of the protective surface 100 to form a perimeter for the protective surface.

The protective surface 100 shown in FIG. 1 may be installed by excavating a cavity into which to install the surface, filling the cavity with a desired thickness of crushed stone or the like, preparing a pourable cushion layer 10, filling the cavity with the pourable cushion layer and spreading the cushion layer to a consistent thickness, and overlaying the cushion layer with a decorative cap layer 20 in much the same way.

The cushion layer 10 of the protective surface 100 may comprise a blend of the following: (a) a rubber chunk component, (b) a tire buffings component, and (c) a binder. Indeed, in some embodiments, the blend that makes up the cushion layer 10 of the protective surface 100 may consist entirely of those three components.

Figure 2:
FIG. 2 shows an example of a chunk component used in embodiments of the cushion layer described herein.

An example of the rubber chunk component 11 is shown in FIG. 2. The rubber chunk component 11 may be made up of granules of reclaimed rubber scrap. Notably for purposes of the present invention, the reclaimed rubber scrap may be from non-tire sources. For instance, the reclaimed rubber scrap may be pre-consumer, post-industrial waste. This pre-consumer, post-industrial rubber scrap may come from any of a variety of sources. In some embodiments, the pre-consumer, post-industrial scrap may come from part or packaging manufacturers. For instance, the pre-consumer, post-industrial rubber scrap may be waste from injection molding processes, compression molding processes, component (e.g. automotive and aeronautical component) manufacturers, or the like.

Because it may come from a variety of sources, the granules that make up the rubber chunk component 11 may include a mixture of different rubber materials. Those rubber materials may include, for example, Ethylene propylene diene monomer rubber (EPDM), nitrile/nitrile butadiene rubbers (NBR), and natural/latex rubbers. Both EPDM and nitrile/NBR, for example, are commonly used by automotive and aeronautical component manufacturers in the production of a variety of seals and hoses/tubings. In some embodiments, for instance, at least 50% of the rubber chunk component 11 may be made up of EPDM, nitrile/NBR, and natural rubbers.

As the rubber chunk component 11 is obtained from non-tire sources, styrene butadiene rubber (SBR) of the sort that makes up tire rubber may be present in relatively small amounts (compared to rubber from tire sources) or absent altogether. For example, in some embodiments, the rubber chunk component 11 may comprise less than 50 wt. % styrene butadiene rubber, alternatively less than 40 wt. % styrene butadiene rubber, alternatively less than 33 wt. % styrene butadiene rubber, alternatively less than 25 wt. % styrene butadiene rubber, alternatively less than 20 wt. % styrene butadiene rubber, alternatively less than 15 wt. % styrene butadiene rubber, alternatively less than 10 wt. % styrene butadiene rubber, alternatively less than 5 wt. % styrene butadiene rubber.

Similarly, because the rubber chunk component 11 is obtained from non-tire sources, it may be free from embedded metals that are present in conventional recycled tire materials. In fact, in some embodiments, the rubber chunk component 11 of the present disclosure may be 100% rubber materials.

The rubber chunk component 11 of the present disclosure may also be softer than conventional tire rubber, which is typically styrene butadiene or a blend of materials made up predominantly of styrene butadiene. Generally, tire rubber has a mean Shore A durometer of about 75 (with the individual chunk pieces having Shore A durometers ranging between about 60 and about 80). In contrast, the individual chunk pieces, or granules, that make up the rubber chunk component 11 of the present disclosure may generally have Shore A durometers between about 45 and about 80. In contrast to chunk made from tires, for instance, the rubber chunk component 11 of the present disclosure may include granules having Shore A durometers less than 60, alternatively less than 55, alternatively less than 50. Also in contrast to chunk made from tires, the weighted average, or mean, Shore A durometer of the mixture of granules making up the rubber chunk component 11 of the present disclosure may be less than 75, alternatively less than 70, alternatively less than 65, alternatively less than 60, alternatively less than 55 (as determined by conventional methods).

As shown in FIG. 2, the granules that make up the rubber chunk component 11 may be of irregular sizes and shapes. In some embodiments, the granules may be processed so as to provide some degree of size uniformity. For instance, the granules may be run through one or more filters in order to remove granules above a certain size. For example, the granules may all have at least one dimension with a maximum cross-section of less than one inch. In some embodiments, for instance, the granules may be filtered using a ⅝ inch filter. As such, the granules may all have at least one dimension with a maximum cross-section of ⅝ inch or less.

In other embodiments, the granules may be filtered using ½ inch filter (producing granules having at least one dimension with a maximum cross-section of ½ inch or less), ⅜ inch filter (producing granules having at least one dimension with a maximum cross-section of ⅜ inch or less), ¾ inch filter (producing granules having at least one dimension with a maximum cross-section of ¾ inch or less), ⅞ inch filter (producing granules having at least one dimension with a maximum cross-section of ⅞ inch or less), or the like. In some embodiments, larger pieces of scrap may be ground to provide granules of a desired size range, such as any of the above-cited ranges.

Figure 3:
FIG. 3 shows an example of a tire buffings component used in embodiments of the cushion layer described herein.

An example of the tire buffings component 12 is shown in FIG. 3. As illustrated, the tire buffings component 13 may generally be made up of elongated, i.e. fiber-like, predominantly styrene butadiene rubber (SBR) strands. These strands are recycled tire rubber, typically obtained from the process of re-capping commercial truck tires. In some embodiments, the strands may have a thickness between about 0.5 mm and about 2.0 mm and a length between about 3.0 mm and about 20.0 mm. The strands may generally have an aspect ratio (length to width) of at least 2, alternatively at least 3, alternatively at least 5, alternatively at least 7.

The binder may be any suitable polymeric binding material. In many embodiments, the binder may be polyurethane.

The rubber chunk component 11, the tire buffings component 12, and the binder may be blended together to create a pourable cushion layer material. The blending may be performed using conventional equipment, such as a rotating tumbler. Based on the differences between the chunk component 11 and the tire buffings component 12, the ratio of chunk to tire buffings in the blend may be selected to provide a cushion layer 10 having desired properties.

Embodiments of the present disclosure utilize a ratio of chunk component 11 to tire buffings component 12 between about 1.25:1 and 10:1, alternatively between about 1.25:1 and 8:1, alternatively between about 1.25:1 and 6:1, alternatively between about 1.25:1 and 5:1, alternatively between about 1.25:1 and 3:1, alternatively between about 1.5:1 and 10:1, alternatively between about 1.5:1 and 8:1, alternatively between about 1.5:1 and 6:1, alternatively between about 1.5:1 and 5:1, alternatively between about 1.5:1 and 3:1, alternatively between about 1.5:1 and 2.5:1. Some embodiments of the present disclosure utilize a ratio of chunk component 11 to tire buffings component 12 of about 2:1.

The higher the proportion of the chunk component 11, the lesser the amount of binder is needed to coat all of the rubber particles, and thus the lesser the amount of binder is needed to produce the cushion layer 10. For instance, by utilizing a ratio of chunk component 11 to tire buffings 12 within the disclosed ranges, the binder may be provided in an amount of less than 10% by weight of the blend, alternatively less than 9% by weight of the blend, alternatively less than 8% by weight of the blend, alternatively less than 7% by weight of the blend, alternatively less than 6% by weight of the blend, alternatively less than 5% by weight of the blend. Because the binder is typically relatively expensive, this reduces the overall cost of the cushion layer 10, and thus of the protective surface 100.

The blend of chunk component 11, tire buffings component 12, and binder is desirably configured to be poured in place. Accordingly, once the components are sufficiently blended, the blend may be poured into a cavity in a conventional manner, such as through the use of a pouring cart or wheel-barrow. The poured blend may then be spread, e.g. through hand troweling, to produce a cushion layer 10 having a substantially consistent thickness and a smooth, even finish. As the binder dries and hardens, the cushion layer 10 becomes set. The thickness of the cushion layer 10 may be selected to provide a desired degree of fall protection, i.e. impact absorption. In some embodiments, for example, the cushion layer 10 may be provided with a thickness between about 1 inch and about 10 inches, alternatively between about 1 inch and about 8 inches, alternatively between about 1 inch and about 6 inches, alternatively between about 1 inch and about 5 inches.

The protective surface 100 may also be provided with a decorative cap layer 20. In some embodiments, the decorative cap layer 20 may be a poured-in-place material that can be installed by pouring and spreading in much the same manner as the cushion layer 10. For instance, the decorative cap layer 20 may itself by a blend of one or more rubber materials and a binder. In some embodiments, for example, the decorative cap layer 20 may comprise EPDM, TPV, or another treated rubber blended with a polyurethane binder. The rubber granules used in the cap layer 20 may generally have a greater degree of uniformity than those used in the cushion layer 10. For example, in some embodiments, the rubber granules used in the cap layer 20 may have cross-sections between about 1 mm and about 4 mm or between about 0.5 mm and about 1.5 mm. The cap layer 20 may also be prepared in any number of desirable colors, such as through the provision of pre-colored granules and the (typically on-site) mixing of those pre-colored granules in a desired ratio. The cap layer 20 may have any desired thickness. In many embodiments, the cap layer 20 may have a thickness of less than 1.5 inches, alternatively less than 1 inch, alternatively less than ¾-inch.

In some embodiments, the cap layer 20 may comprise a synthetic grass or turf component. The synthetic grass or turf component may be laid directly over the cushion layer 10 in place of a rubber-based cap layer. Or the synthetic grass or turf component may be laid over a rubber-based cap layer 20 such as is described above. In other embodiments, an infill layer may be deposited between the cushion layer 10 and the synthetic grass or turf cap layer 20. The infill layer may be made up of any number of materials, and need not be rubber based. For instance, in some embodiments, the infill layer may comprise an acrylic-coated sand. In some embodiments the infill layer may also contain one or more anti-bacterial agents.

Embodiments of the protective surface 100 described herein have been tested for impact attenuation and have been found to be competitive with conventional protective surfaces of similar thicknesses.

Moreover, because of the cost savings that can be achieved using embodiments of the cushion layer 10 described herein, a protective layer 100 could be provided with a cushion layer 10 having a greater thickness at a comparable cost to a protective surface having a conventional cushion layer of lesser thickness. In this way, the present invention may provide a protective surface 100 having at least the same degree of impact attenuation as a conventional protective surface, but achieved at a lesser cost.

An embodiment of a protective surface prepared in accordance with the present disclosure was tested for head impact criteria (HIC) properties, as tested by the test procedure designated by IPEMA (International Play Equipment Manufacturers Association) as Impact Attenuation Test ASTM F1292-18 (Rev. 6, Effective Date 2018-1-25), at various thicknesses, and found to provide desirable results.

Specifically, a cushion layer consisting essentially of a rubber chunk component made up of granules of reclaimed rubber scrap from non-tire sources, a tire buffings component, and a polyurethane binder, in which the chunk component and the tire buffings component are in a 2:1 ratio (chunk to buffings), was prepared. The polyurethane binder was present in the blend at about 7% by weight. Samples having upper and lower surfaces measuring 24-inch by 24-inch square and having a variety of thicknesses between 1.5 inches and 3.0 inches were prepared. A cap layer consisting essentially of Rosehill TPV (1-4 mm granule size), available from Rosehill Polymers Group, and polyurethane binder, was placed over each sample at a thickness of 0.5 inches. The Rosehill TPV made up about 83% by weight of the cap layer, with the polyurethane binder making up the other about 17% by weight. Samples were then sent to TUV SUD America Inc. for testing in accordance with the IPEMA Impact Attenuation Test ASTM F1292-18 (Rev. 6, Effective Date 2018-1-25). All surfaces were dry at the time of testing. The results of the testing are provided in the below examples.

Example 1

Three samples, each of which consisted of a cushion layer having a thickness of 1.5 inches and a cap layer having a thickness of 0.5 inches, for a total combined thickness of 2.0 inches, were tested in compliance with ASTM FR1292-18 at a specified impact height of 4 feet. The testing was performed at three different measured surface temperatures: −6° C. (21.2° F.), 23° C. (73.4° F.), and 49° C. (120.2° F.). The results are shown in the tables below:

| Drop | Surface Temp | Height | HIC |
|---|---|---|---|
| 1 | −6° C. (21.2° F.) | 4 Ft. | 580 |
| 2 | −6° C. (21.2° F.) | 4 Ft. | 624 |
| 3 | −6° C. (21.2° F.) | 4 Ft. | 597 |
| Average (of second and third drops) | | | 610.5 |

| Drop | Surface Temp | Height | HIC |
|---|---|---|---|
| 1 | 23° C. (73.4° F.) | 4 Ft. | 630 |
| 2 | 23° C. (73.4° F.) | 4 Ft. | 739 |
| 3 | 23° C. (73.4° F.) | 4 Ft. | 746 |
| Average (of second and third drops) | | | 742.5 |

| Drop | Surface Temp | Height | HIC |
|---|---|---|---|
| 1 | 49° C. (120.2° F.) | 4 Ft. | 621 |
| 2 | 49° C. (120.2° F.) | 4 Ft. | 741 |
| 3 | 49° C. (120.2° F.) | 4 Ft. | 684 |
| Average (of second and third drops) | | | 712.5 |

Example 2

Three samples, each of which consisted of a cushion layer having a thickness of 2.0 inches and a cap layer having a thickness of 0.5 inches, for a total combined thickness of 2.5 inches, were tested in compliance with ASTM FR1292-18 at a specified impact height of 5 feet. The testing was performed at three different measured surface temperatures: −6° C. (21.2° F.), 23° C. (73.4° F.), and 49° C. (120.2° F.). The results are shown in the tables below:

| Drop | Surface Temp | Height | HIC |
|---|---|---|---|
| 1 | −6° C. (21.2° F.) | 5 Ft. | 632 |
| 2 | −6° C. (21.2° F.) | 5 Ft. | 742 |
| 3 | −6° C. (21.2° F.) | 5 Ft. | 759 |
| Average (of second and third drops) | | | 750.5 |

| Drop | Surface Temp | Height | HIC |
|---|---|---|---|
| 1 | 23° C. (73.4° F.) | 5 Ft. | 81 |
| 2 | 23° C. (73.4° F.) | 5 Ft. | 851 |
| 3 | 23° C. (73.4° F.) | 5 Ft. | 735 |
| Average (of second and third drops) | | | 793.0 |

| Drop | Surface Temp | Height | HIC |
|---|---|---|---|
| 1 | 49° C. (120.2° F.) | 5 Ft. | 719 |
| 2 | 49° C. (120.2° F.) | 5 Ft. | 903 |
| 3 | 49° C. (120.2° F.) | 5 Ft. | 733 |
| Average (of second and third drops) | | | 818.0 |

The samples were also tested at specified impact heights of 4 feet and 6 feet (one foot higher and one foot lower than the 5 foot specified impact height). The test results demonstrated that a cushion layer having a thickness of 2.0 inches could also be used to provide significant levels of fall protection at 4 feet. The results are shown in the tables below:

| Drop | Surface Temp | Height | HIC |
|---|---|---|---|
| 1 | −6° C. (21.2° F.) | 4 Ft. | 475 |
| 2 | −6° C. (21.2° F.) | 4 Ft. | 506 |
| 3 | −6° C. (21.2° F.) | 4 Ft. | 418 |
| Average (of second and third drops) | | | 462.0 |

| Drop | Surface Temp | Height | HIC |
|---|---|---|---|
| 1 | 23° C. (73.4° F.) | 4 Ft. | 509 |
| 2 | 23° C. (73.4° F.) | 4 Ft. | 546 |
| 3 | 23° C. (73.4° F.) | 4 Ft. | 494 |
| Average (of second and third drops) | | | 520.0 |

| Drop | Surface Temp | Height | HIC |
|---|---|---|---|
| 1 | 49° C. (120.2° F.) | 4 Ft. | 507 |
| 2 | 49° C. (120.2° F.) | 4 Ft. | 542 |
| 3 | 49° C. (120.2° F.) | 4 Ft. | 475 |
| Average (of second and third drops) | | | 508.5 |

Example 3

Three samples, each of which consisted of a cushion layer having a thickness of 2.5 inches and a cap layer having a thickness of 0.5 inches, for a total combined thickness of 3.0 inches, were tested in compliance with ASTM FR1292-18 at a specified impact height of 6 feet. The testing was performed at three different measured surface temperatures: −6° C. (21.2° F.), 23° C. (73.4° F.), and 49° C. (120.2° F.). The results are shown in the tables below:

| Drop | Surface Temp | Height | HIC |
|---|---|---|---|
| 1 | −6° C. (21.2° F.) | 6 Ft. | 769 |
| 2 | −6° C. (21.2° F.) | 6 Ft. | 677 |
| 3 | −6° C. (21.2° F.) | 6 Ft. | 811 |
| Average (of second and third drops) | | | 744.0 |

| Drop | Surface Temp | Height | HIC |
|---|---|---|---|
| 1 | 23° C. (73.4° F.) | 6 Ft. | 688 |
| 2 | 23° C. (73.4° F.) | 6 Ft. | 827 |
| 3 | 23° C. (73.4° F.) | 6 Ft. | 710 |
| Average (of second and third drops) | | | 768.5 |

| Drop | Surface Temp | Height | HIC |
|---|---|---|---|
| 1 | 49° C. (120.2° F.) | 6 Ft. | 730 |
| 2 | 49° C. (120.2° F.) | 6 Ft. | 844 |
| 3 | 49° C. (120.2° F.) | 6 Ft. | 858 |
| Average (of second and third drops) | | | 851.0 |

The samples were also tested at specified impact heights of 5 feet and 7 feet (one foot higher and one foot lower than the 6 foot specified impact height). The test results demonstrated that a cushion layer having a thickness of 2.5 inches could also be used to provide significant levels of fall protection at 5 feet. The results are shown in the tables below:

| Drop | Surface Temp | Height | HIC |
|---|---|---|---|
| 1 | −6° C. (21.2° F.) | 5 Ft. | 469 |
| 2 | −6° C. (21.2° F.) | 5 Ft. | 500 |
| 3 | −6° C. (21.2° F.) | 5 Ft. | 533 |
| Average (of second and third drops) | | | 516.5 |

| Drop | Surface Temp | Height | HIC |
|---|---|---|---|
| 1 | 23° C. (73.4° F.) | 5 Ft. | 592 |
| 2 | 23° C. (73.4° F.) | 5 Ft. | 630 |
| 3 | 23° C. (73.4° F.) | 5 Ft. | 592 |
| Average (of second and third drops) | | | 611.0 |

| Drop | Surface Temp | Height | HIC |
|---|---|---|---|
| 1 | 49° C. (120.2° F.) | 5 Ft. | 514 |
| 2 | 49° C. (120.2° F.) | 5 Ft. | 586 |
| 3 | 49° C. (120.2° F.) | 5 Ft. | 544 |
| Average (of second and third drops) | | | 565.0 |

Example 4

Three samples, each of which consisted of a cushion layer having a thickness of 3.0 inches and a cap layer having a thickness of 0.5 inches, for a total combined thickness of 3.5 inches, were tested in compliance with ASTM FR1292-18 at a specified impact height of 7 feet. The testing was performed at three different measured surface temperatures: −6° C. (21.2° F.), 23° C. (73.4° F.), and 49° C. (120.2° F.). The results are shown in the tables below:

| Drop | Surface Temp | Height | HIC |
|---|---|---|---|
| 1 | −6° C. (21.2° F.) | 7 Ft. | 769 |
| 2 | −6° C. (21.2° F.) | 7 Ft. | 697 |
| 3 | −6° C. (21.2° F.) | 7 Ft. | 782 |
| Average (of second and third drops) | | | 739.5 |

| Drop | Surface Temp | Height | HIC |
|---|---|---|---|
| 1 | 23° C. (73.4° F.) | 7 Ft. | 746 |
| 2 | 23° C. (73.4° F.) | 7 Ft. | 786 |
| 3 | 23° C. (73.4° F.) | 7 Ft. | 867 |
| Average (of second and third drops) | | | 826.5 |

| Drop | Surface Temp | Height | HIC |
|---|---|---|---|
| 1 | 49° C. (120.2° F.) | 7 Ft. | 587 |
| 2 | 49° C. (120.2° F.) | 7 Ft. | 734 |
| 3 | 49° C. (120.2° F.) | 7 Ft. | 664 |
| Average (of second and third drops) | | | 699.0 |

The samples were also tested at specified impact heights of 6 feet and 8 feet (one foot higher and one foot lower than the 7 foot specified impact height). The test results demonstrated that a cushion layer having a thickness of 3.0 inches could also be used to provide significant levels of fall protection at 6 feet. The results are shown in the tables below:

| Drop | Surface Temp | Height | HIC |
|---|---|---|---|
| 1 | −6° C. (21.2° F.) | 6 Ft. | 641 |
| 2 | −6° C. (21.2° F.) | 6 Ft. | 649 |
| 3 | −6° C. (21.2° F.) | 6 Ft. | 538 |
| Average (of second and third drops) | | | 593.5 |

| Drop | Surface Temp | Height | HIC |
|---|---|---|---|
| 1 | 23° C. (73.4° F.) | 6 Ft. | 547 |
| 2 | 23° C. (73.4° F.) | 6 Ft. | 606 |
| 3 | 23° C. (73.4° F.) | 6 Ft. | 587 |
| Average (of second and third drops) | | | 596.5 |

| Drop | Surface Temp | Height | HIC |
|---|---|---|---|
| 1 | 49° C. (120.2° F.) | 6 Ft. | 475 |
| 2 | 49° C. (120.2° F.) | 6 Ft. | 551 |
| 3 | 49° C. (120.2° F.) | 6 Ft. | 470 |
| Average (of second and third drops) | | | 510.5 |

Embodiments of the present disclosure are directed to a cushion layer that, provided at a thickness of 1.5 inches and having an additional cap layer of 0.5 inches (the cap layer consisting essentially of Rosehill TPV (1-4 mm granule size) and a polyurethane binder), when tested by ASTM F1292-18 at a specified impact height of 4 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

Embodiments of the present disclosure are directed to a cushion layer that, provided at a thickness of 2.0 inches and having an additional cap layer of 0.5 inches (the cap layer consisting essentially of Rosehill TPV (1-4 mm granule size) and a polyurethane binder), when tested by ASTM F1292-18 at a specified impact height of 5 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

Embodiments of the present disclosure are directed to a cushion layer that, provided at a thickness of 2.0 inches and having an additional cap layer of 0.5 inches (the cap layer consisting essentially of Rosehill TPV (1-4 mm granule size) and a polyurethane binder), when tested by ASTM F1292-18 at a specified impact height of 4 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

Embodiments of the present disclosure are directed to a cushion layer that, provided at a thickness of 2.5 inches and having an additional cap layer of 0.5 inches (the cap layer consisting essentially of Rosehill TPV (1-4 mm granule size) and a polyurethane binder), when tested by ASTM F1292-18 at a specified impact height of 6 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

Embodiments of the present disclosure are directed to a cushion layer that, provided at a thickness of 2.5 inches and having an additional cap layer of 0.5 inches (the cap layer consisting essentially of Rosehill TPV (1-4 mm granule size) and a polyurethane binder), when tested by ASTM F1292-18 at a specified impact height of 5 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

Embodiments of the present disclosure are directed to a cushion layer that, provided at a thickness of 3.0 inches and having an additional cap layer of 0.5 inches (the cap layer consisting essentially of Rosehill TPV (1-4 mm granule size) and a polyurethane binder), when tested by ASTM F1292-18 at a specified impact height of 7 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

Embodiments of the present disclosure are directed to a cushion layer that, provided at a thickness of 3.0 inches and having an additional cap layer of 0.5 inches (the cap layer consisting essentially of Rosehill TPV (1-4 mm granule size) and a polyurethane binder), when tested by ASTM F1292-18 at a specified impact height of 6 feet has an average HIC score less than 1000, alternatively less than 950, alternatively less than 900, alternatively less than 850, alternatively less than 800, alternatively less than 750, alternatively less than 700, alternatively less than 650, alternatively less than 600, alternatively less than 550, at each of the three temperatures (−6° C. (21.2° F.), 23° C. (73.4° F.), and 49° C. (120.2° F.)) used for testing.

It can be seen that the described embodiments provide unique and novel poured in place surfaces, and cushion layers for those poured in place surfaces, having a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A protective surface, such as may be used to create a play surface at a playground, the protective surface having a cushion layer comprising a blend of:
   a rubber chunk component made up of granules of reclaimed rubber scrap, the reclaimed rubber scrap being from non-tire sources;
   a tire buffings component; and
   a binder;
   wherein the chunk component and the tire buffings are present in a ratio between 1.25:1 and 5:1 (chunk to buffings).

2. The protective surface of claim 1, wherein the chunk component and the tire buffings are present in a ratio between 1.5:1 and 3:1 (chunk to buffings).

3. The protective surface of claim 1, wherein the rubber chunk component has a mean Shore A durometer less than 75.

4. The protective surface of claim 1, wherein the binder makes up less than 10% by weight of the blend.

5. The protective surface of claim 1, wherein the binder makes up less than 8% by weight of the blend.

6. The protective surface of claim 1, wherein the rubber chunk component consists of granules having at least one dimension with a maximum cross-section of less than one inch.

7. The protective surface of claim 1, wherein the rubber chunk component comprises EPDM, nitrile/NBR, natural rubbers, or any combination thereof.

8. The protective surface of claim 1, wherein the rubber scrap is pre-consumer, post-industrial waste.

9. The protective surface of claim 1, wherein the rubber chunk component does not contain any embedded metals.

10. The protective surface of claim 1, wherein the tire buffings are strands of predominantly styrene butadiene rubber.

11. The protective surface of claim 10, wherein the strands have a thickness between about 0.5 mm and 2.0 mm and a length between about 3.0 mm and about 20.0 mm.

12. The protective surface of claim 1, wherein the binder is polyurethane.

13. The protective surface of claim 1, wherein the cushion layer is configured to be poured in place.

14. The protective surface of claim 1, wherein, when a protective surface consisting of the cushion layer at a thickness of 1.5 inches and an additional cap layer at a thickness of 0.5 inches, is tested by ASTM F1292-18 at a specified impact height of 4 feet, the average HIC score at each of the three temperatures (−6° C. (21.2° F.), 23° C. (73.4° F.), and 49° C. (120.2° F.)) used for testing is less than 750.

15. The protective surface of claim 1, wherein, when a protective surface consisting of the cushion layer at a thickness of 2.0 inches and an additional cap layer at a thickness of 0.5 inches, is tested by ASTM F1292-18 at a specified impact height of 5 feet, the average HIC score at each of the three temperatures (−6° C. (21.2° F.), 23° C. (73.4° F.), and 49° C. (120.2° F.)) used for testing is less than 850.

16. The protective surface of claim 1, wherein, when a protective surface consisting of the cushion layer at a thickness of 2.5 inches and an additional cap layer at a thickness of 0.5 inches, is tested by ASTM F1292-18 at a specified impact height of 6 feet, the average HIC score at each of the three temperatures (−6° C. (21.2° F.), 23° C. (73.4° F.), and 49° C. (120.2° F.)) used for testing is less than 900.

17. The protective surface of claim 1, wherein, when a protective surface consisting of the cushion layer at a thickness of 3.0 inches and an additional cap layer at a thickness of 0.5 inches, is tested by ASTM F1292-18 at a specified impact height of 7 feet, the average HIC score at each of the three temperatures (−6° C. (21.2° F.), 23° C. (73.4° F.), and 49° C. (120.2° F.)) used for testing is less than 850.

18. The protective surface of claim 1, further comprising a cap layer overlying the cushion layer.

19. The protective surface of claim 18, in which the cushion layer is between about one inch and about five inches thick.

20. The protective surface of claim 19, in which the cap layer is less than one inch thick.

\* \* \* \* \*